United States Patent [19]

Frost

[11] 4,298,328

[45] Nov. 3, 1981

[54] EXTRUSION APPARATUS FOR PREVENTING THE DISTORTION OF PERIPHERAL CELLS IN EXTRUDED HONEYCOMB STRUCTURES

[75] Inventor: Rodney I. Frost, Corning, N.Y.

[73] Assignee: Corning Glass Works, Corning, N.Y.

[21] Appl. No.: 148,823

[22] Filed: May 12, 1980

[51] Int. Cl.³ .............................................. B29F 3/04
[52] U.S. Cl. ........................... 425/376 A; 264/209.1; 264/209.8; 425/381; 425/461; 425/466; 425/467
[58] Field of Search .............. 425/461, 463, 464, 467, 425/197, 198, 462, 465, 466, 199, 380–381, 382 R, 376 R, 376 A; 264/177 R, 209.1, 209.8

[56] References Cited

U.S. PATENT DOCUMENTS

| | | | |
|---|---|---|---|
| 3,836,302 | 9/1974 | Kaukeinen | 425/197 |
| 3,905,743 | 9/1975 | Bagley | 425/464 |
| 3,919,384 | 11/1975 | Cantaloupe et al. | 425/461 |
| 3,947,214 | 3/1976 | Cunningham | 425/467 |
| 3,981,657 | 9/1976 | Orso et al. | 425/198 |
| 3,983,283 | 9/1976 | Bagley | 425/461 |
| 4,008,033 | 2/1977 | Folmar et al. | 425/467 |
| 4,168,944 | 9/1979 | Morikawa et al. | 425/464 |
| 4,178,145 | 12/1979 | Hamamoto et al. | 425/467 |

FOREIGN PATENT DOCUMENTS 51-103911  9/1976  Japan.

*Primary Examiner*—Jeffery R. Thurlow
*Attorney, Agent, or Firm*—Robert N. Wardell

[57] ABSTRACT

Disclosed is an improved extrusion apparatus which prevents the distortion of peripheral cells in extruded honeycomb structures. The apparatus includes a die having an outward surface which is beveled to have a primary face and a surrounding face converging in the extrusion direction. An extrusion mask is provided having a central orifice and an entrance face also converging at the same angle in the extrusion direction. The use of an extrusion mask having an entrance face converging at the same angle as the beveled surface of the die body has been found to reduce peripheral cell crushing. Moreover, also disclosed are spacers situated between the die body and the mask which control the thickness of the gap between the die body and mask thus allowing for the provision of extruded honeycomb structures having skins of varying thickness.

8 Claims, 3 Drawing Figures

EXTRUSION APPARATUS FOR PREVENTING THE DISTORTION OF PERIPHERAL CELLS IN EXTRUDED HONEYCOMB STRUCTURES

BACKGROUND OF THE INVENTION

This invention relates to extrusion apparatus for manufacturing extrudable honeycomb structures from materials such as ceramic batches, molten glasses, plastics, molten metals, and similar materials, which have the property of being able to flow or plastically deform during extrusion while being able to become sufficiently rigid immediately thereafter so as to maintain their structural integrity. More particularly, the present invention relates to an improved extrusion die and mask assembly which minimizes the distortion of peripheral cells of the extruded honeycomb structure during the formation of the skin or sheath thereof.

In U.S. Pat. Nos. 3,836,302 to Kaukeinen; 3,947,214 to Cunningham and 4,008,033 to Folmar and Van Dewoestine, various techniques are disclosed for forming extruded honeycomb structures having improved integral skins or sheaths thereabout. In all of these patents, a die body having a plurality of feed passageways which direct extrudate to a larger plurality of discharge slots is placed in conjunction with an extrusion mask which prevents extrusion through at least some of the feed passageways and which partially blocks extrusion through other of the passageways thus compacting extrudate and metering it to form the skin of the finished structure. In the aforementioned Kaukeinen patent, an extrusion mask is diclosed having a central orifice with a tapered side wall which collapses the peripheral cells of the honeycomb structure near the outer surface thereof to simultaneously form an integral skin or sheath about the honeycomb structure. Both the aforementioned Cunningham and Folmar et al patents are improvements over the Kaukeinen patent inasmuch as the number of peripheral cells which are distorted or crushed during extrusion is reduced. In the extrusion masks disclosed by Cunningham and Folmar et al, a peripheral recess is provided about the circumference of the extrusion die mask orifice which meters extrudable material to form the outer skin or sheath of the extruded honeycomb structure.

OBJECT OF THE INVENTION

It is an object of the present invention, to provide a still further improved extrusion die and die mask assembly which further minimizes the crushing of peripheral cells.

It is a further object of the present invention to provide an improved extrusion apparatus which minimizes the crushing of peripheral cells during the formation of an enclosing skin or sheath about an extruded honeycomb structure and yet which is easily modifiable so as to permit simple and expedient changes thereof as the characteristics of the batch material being extruded vary.

These and other objects of the present invention are accomplished by means of an improved extrusion apparatus including a die body and an extrusion die mask which mates therewith. The die body includes an inlet surface and an outlet surface with a plurality of parallel feed passageways opening to the inlet surface and communicating with a plurality of discharge slots which open to the outlet surface. However, in accordance with the present invention, the outlet surface is beveled so as to have a primary face perpendicular to the extrusion direction, the primary face being surrounded by another face which converges in the direction of extrusion thus forming an oblique angle with the primary face. Moreover, the extrusion mask which is provided employs a central orifice for receiving extruded honeycomb structures, the orifice being defined by an entrance face which also converges in the extrusion direction at the same angle as the aforementioned surrounding face so as to provide a peripheral gap about the entrance to the orifice having parallel walls converging in the extrusion direction.

It has been found that such an arrangement permits the extrusion of honeycomb structures having strong peripheral skins yet with a reduced number of crushed or distorted peripheral cells. Moreover, by the simple expedient of providing a spacer situated between the die body and the die mask, the width of the aforementioned gap may be varied so as to accommodate batch mixtures having varying viscosities and more importantly to produce honeycomb structures with differing skin thicknesses without the necessity of remachining new dies or die masks during such an occurrence.

BRIEF DESCRIPTION OF THE DRAWINGS

The present invention will be more fully understood by reference to the accompanying drawings in which.

DETAILED DESCRIPTION OF THE PREFERRED EMBODIMENT

Figure 1:
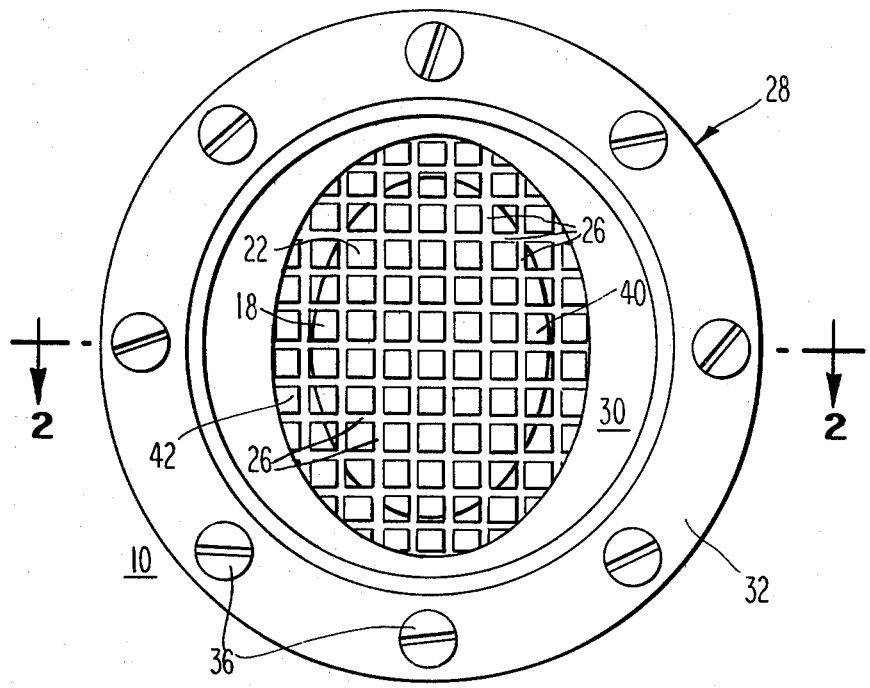
FIG. 1 is a bottom plan view of an extrusion apparatus improved in accordance with the present invention.
Figure 2:
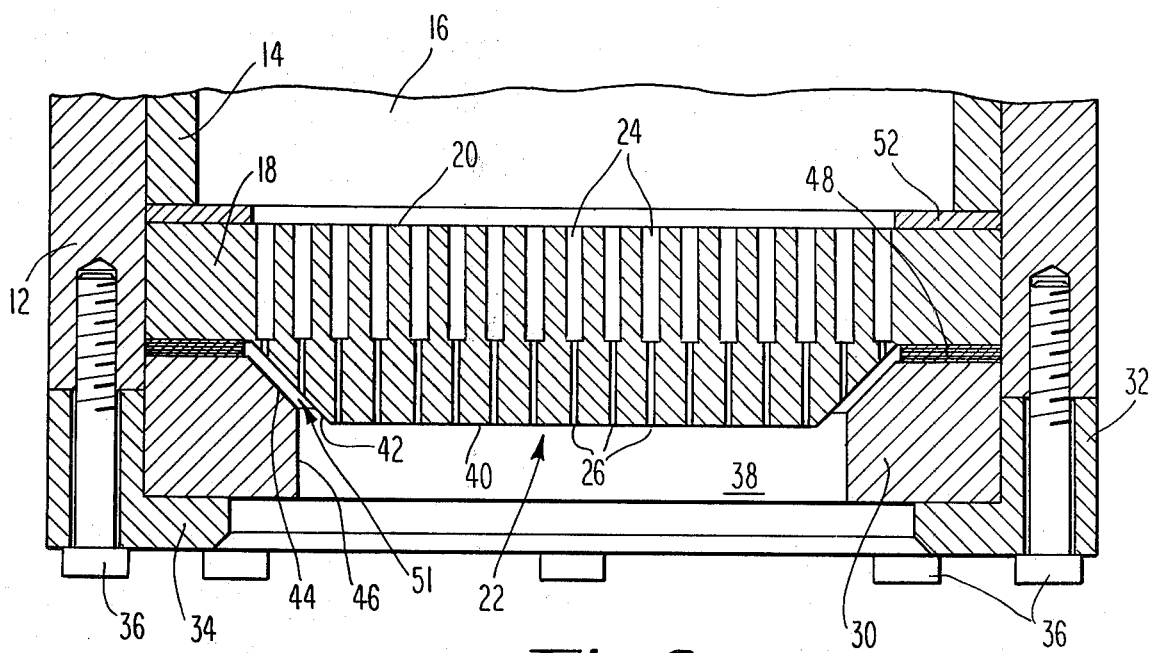
FIG. 2 is an elevational view of a section taken along line 2—2 of FIG. 1.

Referring now to the drawings, and specifically to FIGS. 1 and 2, an extrusion apparatus is shown generally at 10. The extrusion apparatus includes a support structure 12 and a cylinder 14 which forms an extrusion chamber 16 into which the extrudable batch material is placed. An extrusion die body 18 of any desired configuration is positioned adjacent the output end of the extrusion chamber 16. The die body 18 has an inlet surface 20 and an outlet surface shown generally at 22. A plurality of feed passageways 24 are formed in the die body 18 for feeding batch material from the extrusion chamber 16 to form the matrix of a honeycomb structure which exits from the outlet surface 22 of the die body 18. The feed passageways 24 communicate with selected areas of discharge slots 26 so as to deliver the batch material flowing from the extrusion chamber 16 through the feed passageways 24 to the outlet surface 22. As shown in FIG. 1, the interconnected discharge slots 26 form a gridwork through which the batch material is extruded to form the matrix of a coherent honeycomb structure.

A face plate ring assembly is shown generally at 28 in position below the extrusion die apparatus 10. The face plate ring assembly 28 includes an extrusion mask 30 which is retained in position by means of a retaining ring 32. The retaining ring 32 has a lip portion 34 which abuts the mask 30. Moreover, the retaining ring 32 is provided with a plurality of holes for receiving bolts or cap screws 36 which mate with threads formed in the support structure 12 for retaining the face plate ring assembly 28 in fixed relationship to the die body 18.

Figure 3:
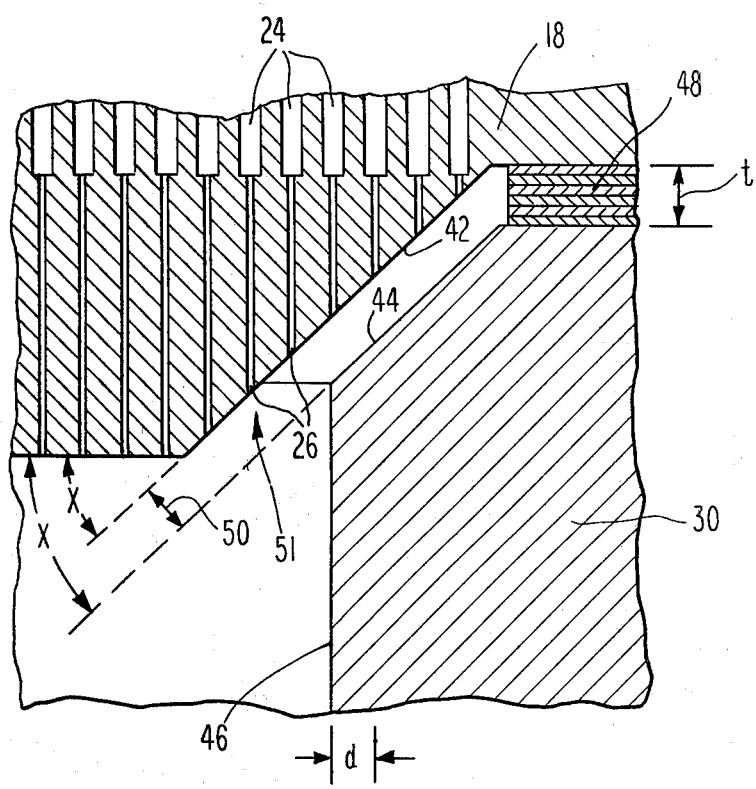
FIG. 3 is an exploded cross-sectional view of the junction between the extrusion die and mask shown in FIG. 2.

While a plurality of feed passageways 24 and discharge slots 26 are shown in FIGS. 1 and 2, it should be understood that, in practice, feed passageways 24 and discharge slots 26 may be more closely spaced than shown in these figures, and in fact, FIG. 3 shows more feed passageways 24 with interconnecting discharge slots 26 opening to the beveled portion of the outlet face 22 than the arrangement shown in FIGS. 1 and 2 so as to more clearly describe the present invention.

The aforementioned extrusion mask 30 includes a central orifice 38 for receiving extruded honeycomb structures formed by the die body 18. It will be appreciated, that batch material from the extrusion chamber 16 is forced, under pressure, through the feed passageways 24 and discharge slots 26 along the longitudinal axes thereof from the inlet surface to the outlet surface. Thus, the extrusion direction may be defined as a path leading from the inlet surface 20 to the outlet surface 22 of the die body 18 along the longitudinal axes of the feed passageways 24 and discharge slots 26.

In accordance with the present invention, the outlet face 22 of the die body 18 is beveled so as to provide a primary face 40 which is substantially perpendicular to the extrusion direction. Further, a secondary surface 42 is thus provided which surrounds the primary surface 40 forming an oblique angle X therewith. The angle X may be within 30° and 60°. However, in the preferred embodiment, the angle X is substantially equal to 45°. While the embodiment shown in FIGS. 1-3 employs a die body 18 wherein the primary surface 40 is an elipsoid, those skilled in the art will appreciate that the surface 40 could also be circular or could assume the shape of an oval, or a polygon. In the situation wherein the primary face 40 of the outlet surface 22 of the die body 18 is a polygon, for example, a square, it should be appreciated that the surrounding surface 42 may, in fact, comprise a plurality of surfaces along each of the sides of the primary surface 40. However, in any event in accordance with the present invention, the surrounding surface or surfaces 42 converge to an edge and form an oblique angle X as best shown in the exploded view of FIG. 3 with the primary face 40 of the outlet surface 22.

Further, in accordance with the present invention, the extrusion mask 30 is so configured that the central orifice 38 thereof is defined by an entrance face 44 which meets an exit face 46. In accordance with the present invention, the extrusion mask 30 is beveled such that the entrance face converges in the extrusion direction, with the angle of convergence being the same angle as the aforementioned angle X. Again, in the preferred embodiment, the entrance face 44 converges at an angle of 45°.

Further, in accordance with the present invention, a spacer 48 is provided between the extrusion mask 30 and the die body 18 so as to provide a peripheral gap 51 between the surrounding face 42 of the die body 18 and the entrance face 44 of the extrusion mask 30, as may best be seen in FIG. 3. Since both of these surfaces 42 and 44 converge at the same angle X, it will be seen that the walls defining the gap 51 are parallel about the circumference of the central orifice 38. Also, as will be seen from FIGS. 2 and 3, the exit face 46 of the extrusion mask 30 is generally formed so as to be substantially parallel to the extrusion direction. Extrudable material entering the gap 51 forms the skin or outer sheath of the extruded honeycomb structure. Further, it has been determined that the arrangement shown wherein the gap 51 is tapered relative to the extrusion direction causes substantially less crushing and distortion of peripheral cells than the arrangement shown in the aforementioned Cunningham and Folmar et al patents wherein the metering gap formation of the skin structure is not tapered. Moreover, a tapered gap provides even greater improvements over the aforementioned Kaukeinen patent wherein no metering gap is disclosed.

As those skilled in the art will appreciate, the formation of extruded honeycomb structures from ceramic material, for example, is complicated by the fact that the shrinkage of the extrudate used in forming the structure may vary from time to time. It is desirable to provide an extrusion apparatus which is easily modifiable as batch characteristics change such that the final dimensions of the extruded structures remain constant. In accordance with the present invention, and as best seen in FIG. 3, the thickness of the honeycomb skin or sheath may be varied by merely changing the thickness of the spacer 48 so as to vary the width 50 of the gap 51. This is easily accomplished by removing the bolts or cap screws 36 and removing the face plate assembly 28 whereby spacers 48 of differing thickness may be inserted. Since the surrounding face 42 of the outlet surface 22 of the die body 18 is substantially parallel to the entrance face 44 of the extrusion mask 30, the insertion of spacers 48 of varying thickness changes the amount of extrudate which is formed into the outer skin or sheath in a linear and easily calculable fashion. In the situation wherein the thickness of the spacers 48 is changed, an annular back plate 52 is provided which abuts the inlet surface 20 of the die body 18. The central opening of the back plate 52 may vary in size so as to selectively open greater or fewer feed passageways 24 thereby metering more or less extrudate to the gap 51.

In those situations wherein it is desired to modify the overall size of the finished extruded honeycomb structure, it is a simple expedient to provide an extrusion mask 30 having differing internal diameter of the orifice at the exit face 46 thereof. As may best be seen from FIG. 3, increasing the internal diameter of the mask 30 by an amount d exposes additional discharge slots 26 for the production of the extruded honeycomb matrix, which slots would otherwise feed extrudate into the gap 51 for the production of the outer sheath or skin of the structure.

While a particular embodiment of the present invention has been shown and described, those skilled in the art will appreciate that various modifications and improvements may be made without departing from the spirit and scope of the present invention as defined by the appended claims.

What is claimed is:

1. An apparatus for extruding a honeycomb structure comprising:
   a die body having an inlet surface, an outlet surface, a plurality of feed passageways opening to said inlet surface, and a plurality of discharge slots communicating with said feed passageways and opening to said outlet surface, the extrusion direction being from said inlet surface to said outlet surface along the longitudinal axes of said passageways and slots, said outlet surface being beveled to have
   a central primary face substantially perpendicular to the extrusion direction, and a surrounding face continuously converging in said extrusion direction to said primary face, and an imaginary extension of said surrounding face further continuously converging in said extrusion direction forming an acute angle between said extension of the surrounding face and said primary face;

an extrusion mask having a central orifice for receiving said extruded structure, said orifice being defined by an exit face substantially parallel to the extrusion direction, and an imperforate entrance face converging in said extrusion direction to meet the exit face, and an imaginary extension of said entrance face further converging in said extrusion direction forming said acute angle between said extension of the entrance face and said primary face; and spacing means for mating said entrance face with said surrounding face in parallel spaced apart relation to form a gap of uniform width therebetween and opening about the periphery of said orifice.

2. The extrusion apparatus of claim 1 wherein said angle varies between 30° and 60°.

3. The extrusion apparatus of claim 2 wherein said angle is substantially equal to 45°.

4. The extrusion apparatus of claim 1 wherein said spacing means comprises adjustable spacers situated between said die body and said mask for controlling the spacing between said surrounding face and said entrance face.

5. The extrusion apparatus of claim 1 wherein said primary face is an elipsoid.

6. The extrusion apparatus of claim 1 wherein said primary face is a circle.

7. The extrusion apparatus of claim 1 wherein said primary face is a polygon.

8. The extrusion apparatus of claim 4 further comprising a blocking means in abutting relationship with a peripheral portion of said inlet surface for preventing the flow of extrudable material through selected ones of said feed passageways communicating with the discharge slots opening to said surrounding face.

* * * * *